United States Patent [19]
Hanson

[11] Patent Number: 5,805,856
[45] Date of Patent: Sep. 8, 1998

[54] SUPPLEMENTAL HEATING SYSTEM

[75] Inventor: Jeffrey H. Hanson, 15 Briarwood Cir., North Easton, Mass. 02356

[73] Assignee: Jeffrey H. Hanson, North Easton, Mass.

[21] Appl. No.: 642,372

[22] Filed: May 3, 1996

[51] Int. Cl.[6] .................................................. A47J 31/00
[52] U.S. Cl. ...................... 392/465; 392/465; 392/424; 392/425; 165/287; 219/386
[58] Field of Search ..................... 392/465, 466, 392/471, 482, 449, 451, 456, 496, 463, 464; 165/287, 300; 126/344, 362

[56] References Cited

U.S. PATENT DOCUMENTS

| | | | |
|---|---|---|---|
| Re. 34,643 | 6/1994 | Payne | 361/62 |
| D. 310,973 | 10/1990 | Edwards et al. | D10/75 |
| D. 320,362 | 10/1991 | Edwards et al. | D10/99 |
| 3,583,843 | 6/1971 | Hirsbrunner et al. | 431/66 |
| 3,742,188 | 6/1973 | Sundbye | 392/465 |
| 3,872,320 | 3/1975 | Juskewicz, Jr. | 307/117 |
| 4,083,398 | 4/1978 | Fallon, Jr. et al. | 165/66 |
| 4,104,668 | 8/1978 | Laar | 392/451 |
| 4,180,128 | 12/1979 | Fallon, Jr. et al. | 165/76 |
| 4,182,567 | 1/1980 | Laar et al. | 392/471 |
| 4,212,628 | 7/1980 | Boatwright | 432/4 |
| 4,315,251 | 2/1982 | Robinson et al. | 340/310 A |
| 4,322,603 | 3/1982 | Bright | 392/325 |
| 4,323,342 | 4/1982 | Sommers, Jr. et al. | 431/66 |
| 4,378,496 | 3/1983 | Brogardh et al. | 250/227 |
| 4,502,625 | 3/1985 | Mueller | 236/11 |
| 4,654,662 | 3/1987 | Van Orsdel | 340/870.03 |
| 4,783,623 | 11/1988 | Edwards et al. | 324/156 |
| 4,792,677 | 12/1988 | Edwards et al. | 250/231 SE |
| 4,811,011 | 3/1989 | Sollinger | 340/870.02 |
| 4,904,995 | 2/1990 | Bonner et al. | 340/870.02 |
| 4,998,102 | 3/1991 | Wyler et al. | 340/870.02 |
| 5,014,213 | 5/1991 | Edwards et al. | 364/483 |
| 5,027,036 | 6/1991 | Ikarashi et al. | 315/169.3 |
| 5,169,301 | 12/1992 | Donnelly et al. | 431/20 |
| 5,198,796 | 3/1993 | Hessling, Jr. | 340/310 A |
| 5,240,022 | 8/1993 | Franklin | 137/1 |
| 5,245,275 | 9/1993 | Germer et al. | 324/142 |
| 5,262,755 | 11/1993 | Mak et al. | 340/310 R |
| 5,363,047 | 11/1994 | Dresti et al. | 324/510 |
| 5,426,552 | 6/1995 | Avitan | 361/42 |
| 5,471,134 | 11/1995 | Oudille et al. | 324/103 P |
| 5,485,340 | 1/1996 | Avitan | 361/45 |
| 5,486,805 | 1/1996 | Mak | 340/310.06 |
| 5,502,339 | 3/1996 | Hartig | 307/31 |

FOREIGN PATENT DOCUMENTS

| | | | |
|---|---|---|---|
| 04-316955 | 9/1992 | Japan | 392/449 |
| 07055258 | 3/1995 | Japan . | |

*Primary Examiner*—Teresa J. Walberg
*Assistant Examiner*—Quan Nguyen
*Attorney, Agent, or Firm*—Nutter, McClennan & Fish, LLP

[57] ABSTRACT

A heating system includes an electric heater having coupled thereto a temperature controller and a power activation relay switch coupled to the temperature controller and a meter system coupled to a power terminal on the electric heater to provide an interruptible supplemental heating system for use in residential or commercial buildings. The heating system provides electrically generated heat to supplement a primary heating system which generates heat using fuel oil, fuel gas such as natural gas, propane gas, or other fossil fuels. The electric heater can be an electric resistance heater coupled in series with a primary furnace powered by fossil fuel. When the electric resistance heater is activated, the heat contributed by the heater reduces the required heat output of the primary furnace by a corresponding amount of thermal energy. In one embodiment, an electric utility provides electric power to the electric resistance heater at a reduced cost on an as available, fully interruptible basis. The electric utility controls power supply availability via the power activation relay switch coupled to a control circuit of the electric resistance heater. Electricity consumed by the electric heater can be separately metered and billed to a user at the reduced cost via the meter system. Since the incremental cost of electric energy at certain times of the day is less than the equivalent net cost of fuel oil or gas used for space and water heating, a reduction in heating costs for space heating and domestic hot water heating is achieved.

19 Claims, 5 Drawing Sheets

SUPPLEMENTAL HEATING SYSTEM

FIELD OF THE INVENTION

This invention relates generally to heating systems and more particularly to methods and apparatus for supplementing an existing heating system.

BACKGROUND OF THE INVENTION

As is known in the art, a furnace is an apparatus in which heat is liberated and transferred directly or indirectly to a fluid mass for example. One source of heat is provided by the release of energy during the oxidation of a fossil fuel such as fuel oil or fuel gas in a process typically known as combustion. Another source of heat is provided by the flow of electric current through heating elements. In either case the heat is transferred from the furnace to a heat conveying medium which may be provided, for example, as a fluid such as water or air. The heat conveying medium is typically carried in pipes or conduits to a region to be heated As is also known, many residential and commercial buildings include a primary furnace which typically includes a furnace enclosure and a burner. The burner ignites a particular type of fuel in the furnace enclosure to generate heat. The particular type of burner is selected to ignite a particular type of fuel. For example, a gas furnace includes a gas burner and an enclosure in which a fuel gas is burned. An oil furnace, on the other hand, includes an oil pump, a burner tip and a furnace enclosure in which fuel oil is burned. Such gas and oil heating systems have heating costs which depend upon a variety of factors such as the price of the gas or oil being burned, the stoichiometric efficiency of the gas or oil heating furnace and the temperature of the exhaust gas to a chimney or stack.

In a so called hot water heating system, the heat conveying medium is water. Heat transfer in British Thermal Units (BTU) equals pounds of water circulated multiplied by a drop in water temperature. Hot water heating systems typically include a water heating means which may be provided as a furnace and burner and heat emitting means such as radiators, convectors, base-board radiators or panel coils. A circulation system connects the primary furnace to the various heating emitting units and includes a system of pipes, pumps and temperature control circuits which establish circulation of the water or other heat conveying medium to regions to be heated.

Similarly, in a so-called hot air heating system, the heat conveying medium may be provided as air. In a hot air heating system, air or another gas, rather than a liquid such as water is heated and circulated through a series of pipes or conduits. The conduits carry the heated air and expel the heated air through one or more air vents into areas of a commercial or residential building to be heated. Thus in both hot water heating systems and hot air heating systems the fluid is heated with the primary furnace-which is powered by gas or oil fuel.

One problem with such gas or oil powered heating systems, however, is that it can be relatively expensive to continuously heat residential or commercial buildings. This is particularly true in those geographic locations where an ambient environmental temperature is typically below 50 degrees Fahrenheit. For example, in the northeast portion of the United States of America, there are months during the year when the average daily environmental temperature is often below 50 degrees Fahrenheit and may be as low as or lower than 30 degrees Fahrenheit. Furthermore, gas and oil fuels can be subject to price variations which lead to additional costs. Such price variations may be due, for example, to an embargo of gas or oil fuel, a rise in demand for gas or oil fuel, lack of competitively priced heating alternative, or other situations which arise and which are beyond a consumers' control.

One alternative to generating heat with gas or oil fuel is the generation of heat with electricity. One generally required characteristic of an electric utility company is that the utility be capable of meeting the peak power demand (i.e. load) of consumers of electricity (i.e. electric utility customers) while retaining a predetermined margin of reserve power. Based on historical usage, this establishes a predetermined base level of power generation capability which the utility must have available at all times. However, because most customers do not demand their peak level of power at all times, there are many hours in a year during which the utility's power generation capacity, and therefore capital investment, is not being fully utilized. Such periods of relatively low power usage are typically referred to as "offpeak" hours. Because electricity cannot in general be stored, with a few exceptions such as battery and pumped storage, utility power sources generate an amount of electricity which substantially matches the customer demand. Thus, as the customer demand for electricity decreases, the utility power generation sources reduce the amount of electricity generated by an amount corresponding to the reduction in customer demand. Such decreases in customer demand and electricity generated typically occur daily during the nighttime hours. Due to the lack of an efficient storage medium, the utilities are forced to operate power generation equipment at less than optimum operating parameters which leads to technical problems in the operation of the electrical power generation systems. Furthermore by operating at reduced power generation capability, there is a concomitant reduction in financial returns of the utility company due to low utilization of a capital investment.

It would, therefore, be desirable to selectively utilize lower cost heating sources to heat residential or commercial buildings. For example, it would be desirable to heat a commercial or residential building with electricity when the cost of heat generated by electricity is lower than the cost of heat generated by gas or oil fuel. Similarly, it would be desirable to generate heat with gas or oil fuel when the cost of generating heat with gas or oil fuel is lower than the cost of heat generated by electricity. It would also be desirable to provide a method and apparatus for increasing the demand for electricity at predetermined periods of time.

SUMMARY OF THE INVENTION

It has thus been recognized that there exists certain periods of time when electric power can be supplied and is available at relatively low cost. Such relatively low cost electricity is typically available during weekends and those hours of a day (e.g. nighttime hours) when demand for electricity is relatively low. During such times, electric power stations may have an excess of electricity.

Thus, in accordance with the present invention, a heating system includes an electric heater having a first port and second port, a temperature controller coupled to the electric heater, a power activation relay switch coupled to the temperature controller and a meter system coupled to a power terminal on the electric heater. With this particular arrangement an interruptible supplemental heating system for use in residential or commercial buildings is provided. The heating system provides electrically generated heat which may be used to supplement a primary heating system which generates heat using fuel oil, fuel gas such as natural gas, and propane gas, or other fossil fuels. The electric heater may be provided, for example, as an electric resistance heater, coupled in series with a primary furnace powered by fossil fuel. When the electric resistance heater is activated and provided with electricity, the heat contributed by the heater reduces the required heat output of the primary fossil fuel based primary furnace by a corresponding amount of thermal energy. In a preferred embodiment, an electric utility provides the electric power to the electric resistance heater at a reduced cost on an as available, fully interruptible basis. The electric utility controls power supply availability via the power activation relay switch which is coupled to a control circuit of the electric resistance heater. Electricity consumed by the electric heater can be separately metered and billed to a user at the reduced cost via the meter system. Since the incremental cost of electric energy at certain times of the day is less than the equivalent net cost of fuel oil or fuel gas typically used for space and water heating, a significant reduction in heating costs for space heating as well as domestic hot water heating can be achieved.

The relay switch may be coupled to a control circuit at the electric utility, via a signal line such as a telephone line, or alternatively the relay switch may be coupled to the electric utility control circuit via a wireless connection. For example, the relay switch may be activated via a radio frequency (RF) signal emitted from the electric utility control circuit. Upon remote activation of the relay switch by the electric utility, the electric heater preheats the heating system fluid (e.g. water or air) prior to its return to the primary furnace (e.g. the primary gas or oil furnace). Such pre-heating reduces or may even eliminate the heat input requirement of the primary furnace thus eliminating the need for the primary furnace to burn gas or oil. In those systems which include a hot water heater, a heat exchanger may be coupled to the hot water heater. In this case, a portion of the preheated water is circulated through the heat exchanger for heating of domestic hot water. The system thus provides cost effective space and hot water heating when the electric resistance heater is operated with available low cost "off-peak" electricity. Such low cost electricity is typically provided on a daily bases by electric power supply companies. During these "low cost" electricity time periods, the incremental cost of electric energy on a dollar per BTU ($/BTU) basis is normally lower than the equivalent energy cost of fuel oil such as No. 2 fuel oil or fuel gas such as Firm Natural gas. In a preferred embodiment, via the separate meter system the reduced electric rate can be applied only to a new, incremental electric load for non-electric based space and domestic hot water heating. For the utility, the system provides the ability to provide an additional electric load at times when such an additional electric load may be advantageous to utility system operation. Further, the electric utility will not have an "obligation to serve" this interruptible electric load and may terminate supply of electricity any time, for any duration via the remote controlled relay switch. It should be noted that in some applications, it may be desirable to have the utility control circuit activate multiple supplemental heating systems each having an independent relay switch. In other applications it may be desirable to have the utility control circuit activate a single relay switch which controls a plurality of supplemental heating systems.

BRIEF DESCRIPTION OF THE DRAWINGS

The foregoing features of the invention, as well as the invention itself may be more fully understood from the following detailed description of the drawings, in which.

DESCRIPTION OF THE PREFERRED EMBODIMENTS

Figure 1:
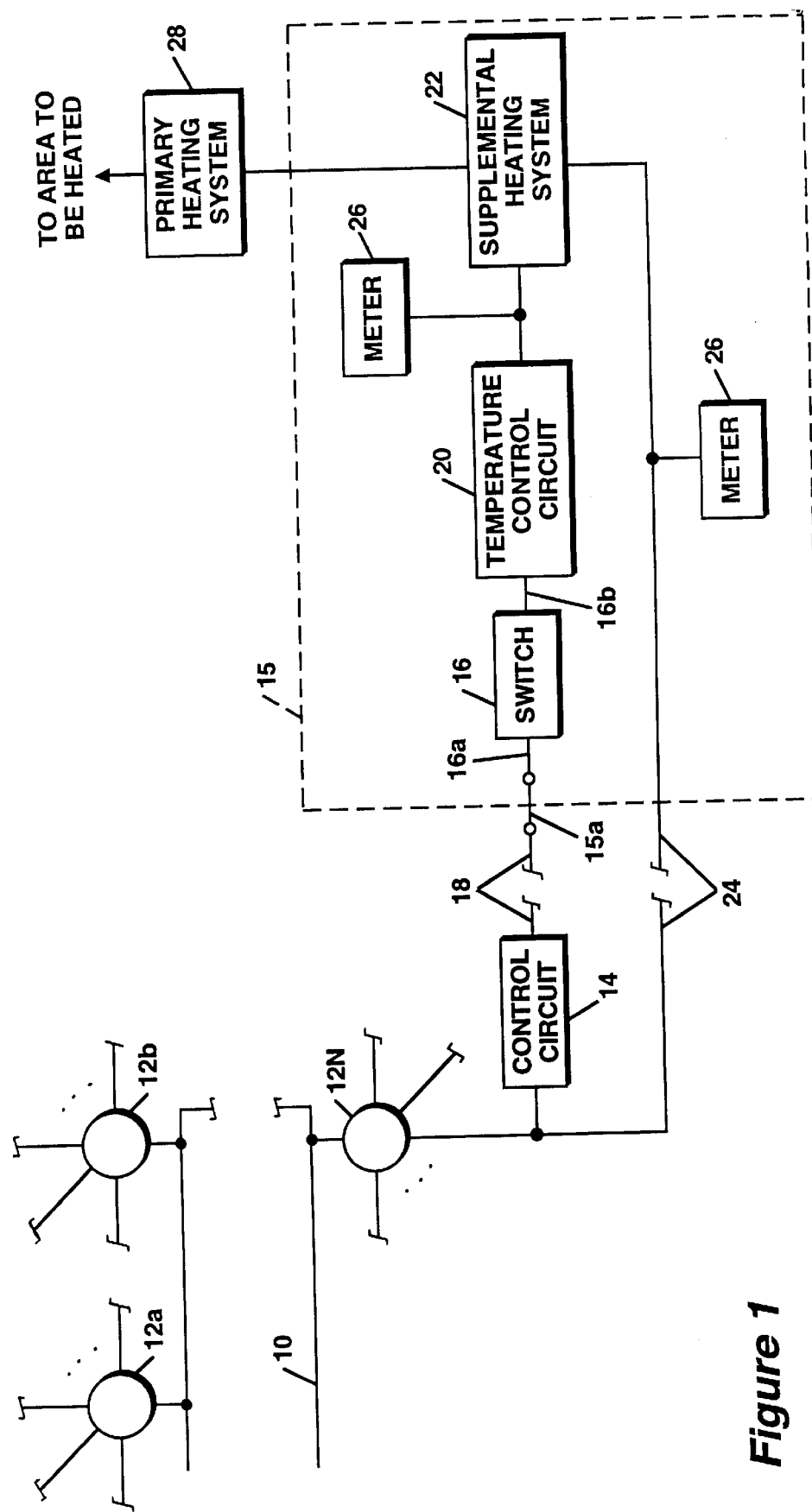
FIG. 1 is a supplemental heating system coupled to a power grid.

Referring now to FIG. 1, a power grid 10 has a plurality of power generators 12A–12N generally denoted 12 coupled thereto. Each of the power generators 12 may be provided as a private power generator (i.e. one owned by a single person or a group of persons) or alternatively one or more of the power generators may correspond to a public utility power generator. Each of the power generators provide electricity which is available on the grid to be used and sold by others of the power generators 12.

For example, power generator 12a may at some particular time have excess electricity available to sell to power generated 12N at a cost lower than that at which power generator 12N generates electricity at that particular time. Thus, operators of power generator 12N may purchase, receive and distribute electricity from power generator 12a. Each of the power generators 12 provides electricity to a plurality of commercial and residential buildings and systems (not shown).

A control circuit 14 coupled to power generator 12N provides a control signal to an input terminal 15a of a supplemental heating system 15. A remotely activated relay switch has a first terminal 16a coupled to supplemental heating system input terminal 15a and a second terminal 16b coupled to an input terminal of a temperature control circuit 20. Control circuit 14 and switch 16 may be coupled via signal lines or via an RF, VHF, UHF or other radio frequency link generally denoted 18.

When the switch 16 receives a first pre-determined signal from the control circuit 14, the switch 16 causes the temperature control circuit 20 to activate a supplemental heater 22. It should be noted that switch 16 can be provided as a single switch controlling activation of multiple supplemental heaters 22. In such an embodiment, each of the heaters would preferably be located within a single building or location. Alternatively, control circuit 14 may concurrently activate a plurality of switches 16, each of the switches controlling supplemental heaters 22 at different locations.

The supplemental heater 22 receives power in the form of an electrical current from the generator 12N over a power supply line 24. In this particular embodiment, the amount of electricity which is provided from power generator 12N over power supply line 24 to the supplemental heater 22 is recorded by a meter 26. Meter 26 may be provided as a current flow measuring device which measures kilowatt hours (KWH) of electric current or alternatively meter 26 may be provided as an operational timer hour meter (HR) which measures the duration of operation of the supplemental heater 22. In the case where the meter is provided as an operational timer 26' then it may be preferable to couple the operational timer 26' between the temperature control circuit 20 and heating system 22 as shown. The amount of electricity consumed by the supplemental heater 22 may thus be measured separately from any other electricity provided to the location where the supplemental heater 22 is located. It should be noted that the same power line may be coupled to both meter 26 and a power breaker at the location.

Figure 1A:
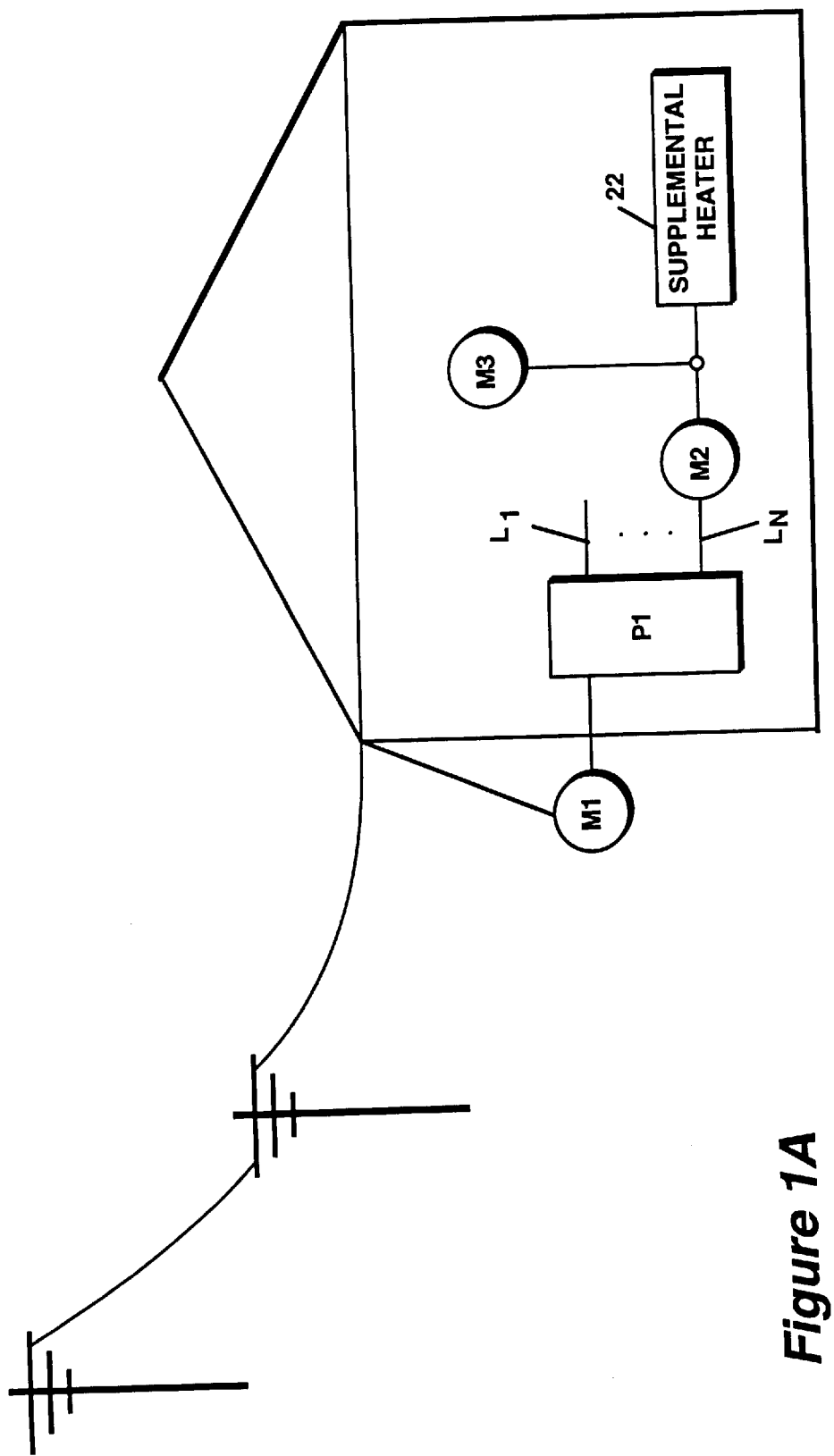
FIG. 1A is a block diagram of a power line fed from a transmission line to a supplemental heating system.

Referring briefly to FIG. 1A, a power supply line is coupled from a transmission system to a building which may correspond to a residential or commercial building, for example. The power supply line is coupled through a main electric meter M1 and fed to a main electrical panel P1 which may include a series of circuit breakers or fuses for example. From panel P1, electricity is distributed through a plurality of power supply lines $L_1$–$L_N$ throughout the remainder of the building.

Power supply line $L_N$ is here shown to be coupled from the electrical panel P1 through a meter M2 to the supplemental heater system 22. In this case meter M2 corresponds to an electric current meter. It should be noted, however, that in a preferred embodiment, meter M2 may be omitted and hour meter M3 may be coupled to supplemental heater 22. It may in some applications, be desirable to provide a system having both an electric current meter and an hour meter. Thus, the cost of the electricity used to power the supplemental heater 22 may be billed to the user at a price at which the power generator 12N makes the electricity available to the user, using a technique commonly referred to as "real time pricing."

In an alternate embodiment, separate power supply lines (not shown) may be coupled to other portions of the residential or commercial building in which the supplemental heater 22 is disposed. Thus in such a case, supplemental heater 22 may be coupled directly to the main power supply line thereby by-passing one or both of meter M1 and panel P1.

Referring again to FIG. 1, upon remote activation of the supplemental heating system via the control circuit 14 and switch 16, the supplemental heating system 22 preheats a heating system fluid such as water or air required by a primary heating system 24. The primary heating system may be provided, for example, as a conventional hot water heating system or a conventional hot air heating system. Thus the supplemental heating system 22 reduces or may even eliminate the heat input requirement of a primary heating system 28. The heated fluid is then provided to an area to be heated. Because the incremental cost of electric energy at certain periods of time can be less than the equivalent net cost of fuel oil or fuel gas normally used for space and water heating, the supplemental heating system 15 of the present invention provides a method and apparatus for reducing annual costs associated with providing hot water and space heating in residential and commercial buildings.

Figure 2:
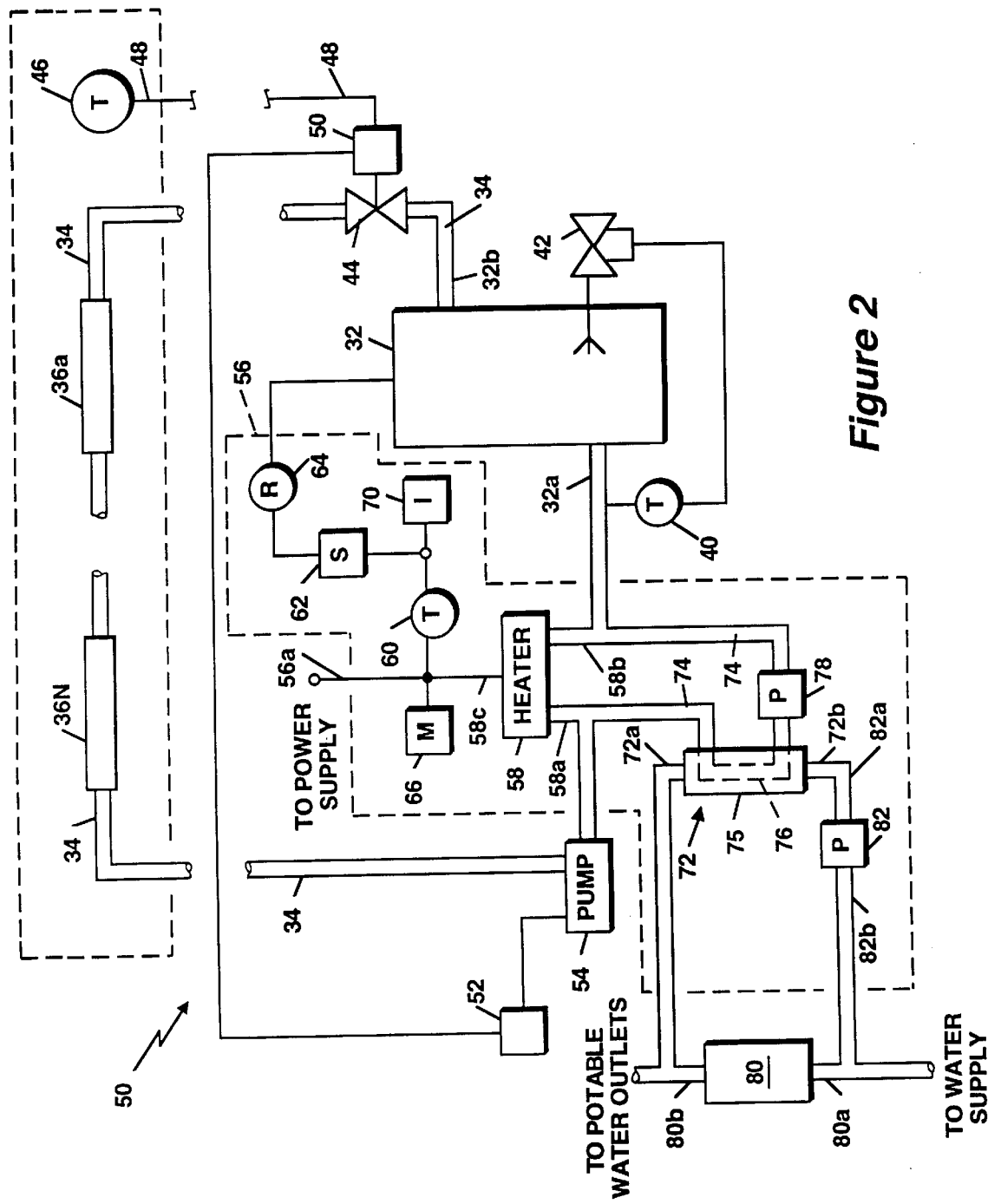
FIG. 2 is a block diagram of a supplemental hot water-space heating system.

Referring now to FIG. 2, a heating system 30 includes a primary heating furnace 32 having an input port 32a and an output port 32b. In this particular embodiment, the primary heating furnace 32 may be provided as a gas furnace or an oil furnace. The furnace 32 receives an input fluid such as water or air at input port 32a and heats the fluid before expelling the fluid at output port 32b.

If the heating system 30 is provided as a so-called forced hot water system, then the furnace 32 heats a liquid fluid typically provided as water which is fed through tubes 34 provided from a material such as copper or the like to one or more heat emitting units 36a–36n generally denoted 36 disposed in a region to be heated 38. The heat emitting units may be provided as radiators, connectors or as any other suitable heat emitting unit well known to those of ordinary skill in the art.

If on the other hand, the heating system is provided as a so-called forced hot-air heating system, then the furnace 32 heats a gas fluid typically provided as air which is fed through tubes or conduits 34 and expelled into the region to be heated 38 via vents or other heat emitting units 36.

A furnace temperature control circuit 40 coupled to the input port 32a of furnace 32 measures the temperature of fluid entering the furnace input port 32a. The furnace temperature control circuit 40 is electrically coupled to a burner 42 which includes a gas valve or oil burner (which includes an associated oil pump) and allows fuel (e.g. fuel oil or fuel gas) to enter and be ignited by the burner 42 in furnace 32 thereby heating the fluid which enters the primary heating furnace 32 via the first input port 32a. Thus, the furnace temperature control circuit 40 senses the temperature of the fluid entering the furnace 32 and if the temperature of the fluid is below a pre-determined threshold temperature, the burner 42 ignites the gas or oil fuel to generate heat to thus increase the temperature of the fluid within the primary heating furnace 32.

For the hot water type system the output port of the primary heating furnace 32 is coupled to one or more zone valves 44 (or circulating pumps). Each of the zone valves 44 are coupled to a thermostat 46 located in the region to be heated 38. When the thermostat 46 is set to a pre-determined temperature an electrical signal is sent along an electrical signal path 48 from the thermostat to a zone valve controller 50. Zone valve controller 50 opens or closes the zone valve 44 in response to the signal provided by thermostat 46. The zone valve controller 50 is also electrically coupled to a relay 52 which provides power to a circulating pump 54. Thus, when heat is required in the region 38, zone valve 44 opens thereby allowing heated fluid such as water or air to flow through the pipes 34 and into heat emitting units 36 located in region 38.

A supplemental heating system 56 is coupled between pump 54 and furnace input port 32a. The supplemental heating system 56 preheats the heating system fluid which corresponds to the heat conveying medium prior to the fluid reaching the input port 32a of the primary heating furnace 32. By preheating the fluid provided to primary heating furnace 32, the energy which the primary heating furnace 32 contributes to raise the fluid to a predetermined temperature is minimized and sometimes eliminated. That is supplemental heating system 56 may heat the fluid provided to input port 32a such that primary heating furnace 32 need not ignite any oil or gas fuel to raise the temperature of the fluid any further. Thus, the fluid heated by supplemental heating system 56 may be pumped directly through the primary heating furnace 32 and subsequently through pipes 34 and into heating emitting units 36 to thus heat the region to be heated 38. In this particular embodiment, the supplemental heating system 56 includes an electric heater 58. Thus, water circulated by the circulating pump 54 flows through and thus may be heated by the electric heater 58.

Also coupled to the electric heater 58 is a thermostat 60, an optional manually operated on-off switch 62 and a relay switch 64. The electric heater 58 also has a power terminal 58c coupled to a power supply line. A meter system 66 is also coupled to the power supply line. Thus, when the electric heater 58 is activated, the meter system 66 records either the amount of electricity consumed by the electric heater 58 or the cumulative amount of time for which the heater is optional.

An indicator 70 is coupled between thermostat 60 and switch 62 to indicate when relay 64 receives a control signal from a supplier of electrical current. In operation, when a control circuit of a supplier of electrical power provides a control signal to relay 64, the relay 64 activates temperature control circuit 60 causing electric heater 58 to draw electric current through terminal 58c. Switch 62 is normally closed and thus provides a relatively low impedance signal path between relay 64 and thermostat 60. In the event a user wishes to prevent supplemental heater from operating, switch 62 may be manually placed in its open position thereby providing a high impedance signal path between relay 64 and thermostat 60. In this case, supplemental heater 58 stops drawing electric current through terminal 58c.

Indicator 70, which may be provided as a visual or audio indicator, provides an indication of when supplemental heater is receiving electrical power through terminal 58c. In this particular example indicator 70 provides such an indication by detecting when a signal exists between relay 64 and thermostat 60. It should appreciated, however, that indicator 70 could alternatively be coupled in the signal path between supplemental heating system input terminal 56a and electrical heater terminal 58c. In such a case, indicator 70 would thus provide an indication of when electrical current or power was being fed directly to electric heater 58.

In this particular embodiment, a heat exchanger 72 is coupled to heater 58 via a fluid path 74. Heat exchanger 74 includes a housing 75 having a coil of tubing 76 disposed therein. A circulator pump 78 circulates water heated by electric heater 58 through coils 76. A hot water heater 80 has an input port 80a and an output port 80b. Water enters the hot water heater 80 via input port 80a and exits the hot water heater 80 via output port 80b. Output port 80b is coupled to input port 72a of heat exchanger 72. An output port 72b of heat exchanger 80 is coupled to an input port 82a of a pump 82 and an output port 82b of pump 82 is coupled to input port 80a of hot water heater 80. Thus, a fluid path exists between hot water heater 80 and heat exchanger 72.

When the temperature of the water in hot water heater 80 falls below a predetermined temperature, pump 82 pumps water from the hot water heater 80 through the heat exchanger 72. The water circulating through coils 76 in housing 75 heats the water pumped through the housing by pump 82. Thus, hot water from the electric heater 58 heats the potable hot water supply provided by hot water heater 80.

Figure 3:
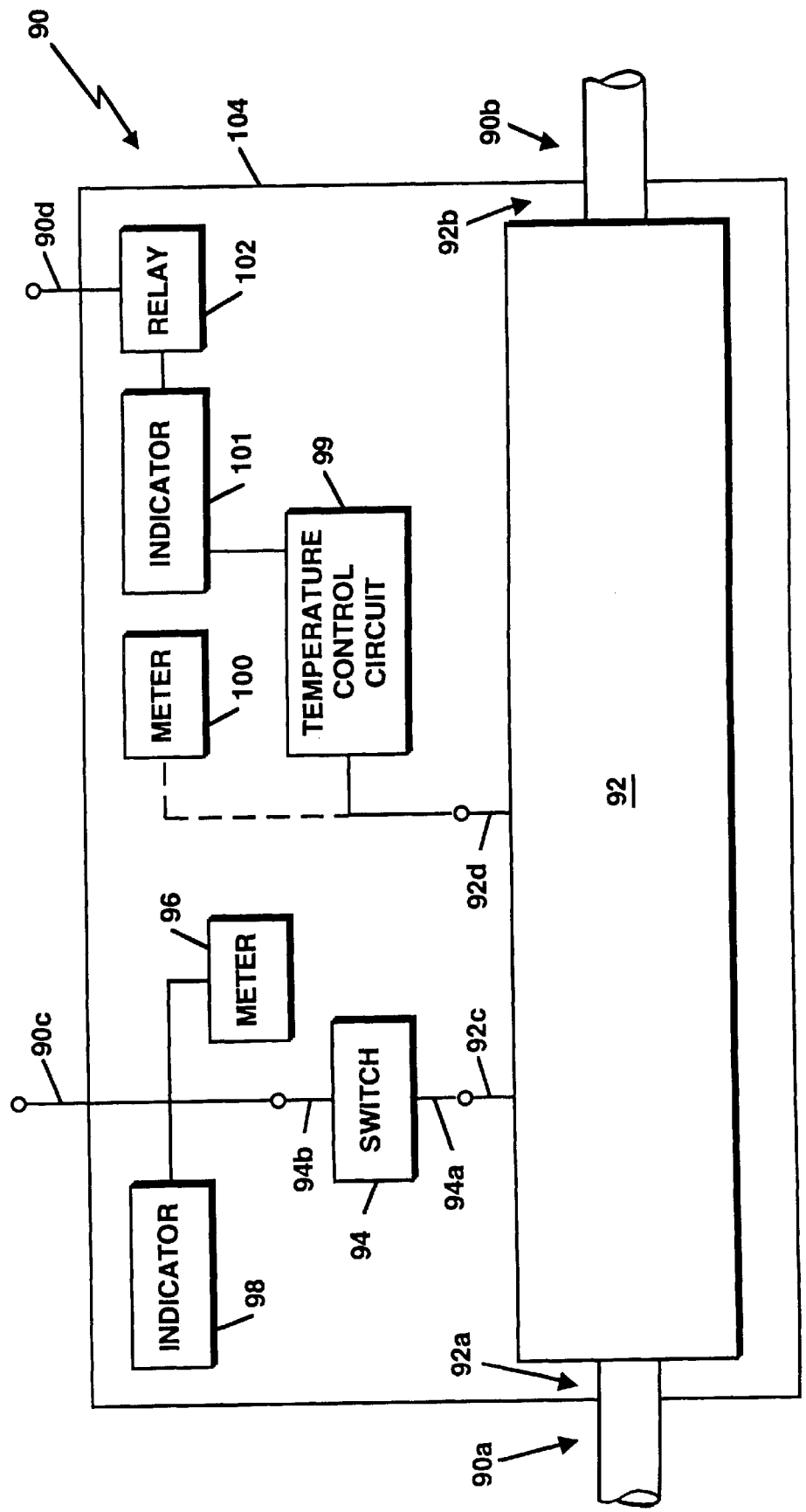
FIG. 3 is a diagram of a supplemental electric heater system.

Referring now to FIG. 3, a supplemental heating system 90 having an input port 90a, and output port 90b, a power terminal 90c and a control terminal 90d includes a circulation heater 92 having an input port 92a coupled to heating system input port 90b and an output port 92b coupled to heating system output port 90b, which may be provided, for example, as the type manufactured by Electric Heater Corporation and identified as one of the parts in a CR3C-XXXX-XX series of circulation heaters. Those of ordinary skill in the art will appreciate of course that any type of heater having similar electrical, mechanical and thermal characteristics may also be used. The particular type of circulation heater is selected in accordance with a variety of factors including but not limited to particular flange sizes, temperature controls, heating temperature and electrical watt size.

A power input terminal 92c of heater 92 is coupled to a first terminal 94a of a switch 94. A second switch terminal 94b is coupled to power terminal 90c of the supplemental heater system 90. Switch 94 is operable by a user of heating system 90 to prevent heater 92 from receiving power through terminal 90c. The control switch 94 is coupled in the electrical signal path between the circulation heater and the electrical power supply line and may be used to prevent electrical power from reaching the circulation heater 92. Thus in those instances when an occupant of a residential or commercial building does not wish to receive electrical power from the power company supplying power the occupant may de-couple the circulation heater 92 from the power supply line. An occupant may wish to de-couple from the power supply line, for example, in case of a failed component in the supplemental heating system Coupled to the power terminal 90c is a meter 96 which records the amount of electricity consumed by the circulation heater 92. Aternatively, meter 96 may be provided as an operational timer which measures the accumulated hours of operation of heater 92.

Also coupled to terminal 90c is an indicator 98 which provides an indication of when electricity is being provided to heater 92. Indicator 98 may, for example, be provided as a visual indicator such as a pilot light which emits a light in response to the circulation heater 92 consuming electricity. Alternatively, indicator 98 may be provided as an audio indicator which emits a sound in response to circulation heater consuming electricity. Regardless of the particular type of indicator coupled to the power supply line, the indicator 98 provides notice of power being supplied to the circulation heater 92.

A first terminal of a temperature control circuit 99 is coupled to a temperature control terminal 92d of the circulation heater 92. In one embodiment, temperature control circuit 100 may be provided as a thermostat. A second terminal of the temperature control circuit 100 is coupled to a relay 102 through an optional indicator 101. In response to a signal transmitted from a power generator to the relay 102, the relay provides an activation signal to temperature control circuit 100 thereby allowing the circulation heater 92 to draw electrical current through power terminal 90c.

A meter 100 which may be provided as an operational timer, measures the accumulated hours of operation of heater 92. Meter 100 may be activated, for example, by a signal having a predetermined signal level provided by temperature control circuit 99.

Heater 92, switch 94, meter 96, indicator 98, temperature control circuit 100, indicator 101 and relay 102 are disposed in a housing 104 which is preferably provided as a sealed housing to thus prevent tampering with meter 96 or temperature control circuit 100. Also, In a preferred embodiment, meter 96 may be provided external to housing 104 and also external to the building in which the supplemental heating system 90 is disposed to thus facilitate reading of the meter 96 by an employee of the electric company which provides electrical power to the supplemental heating system 90.

Figure 4:
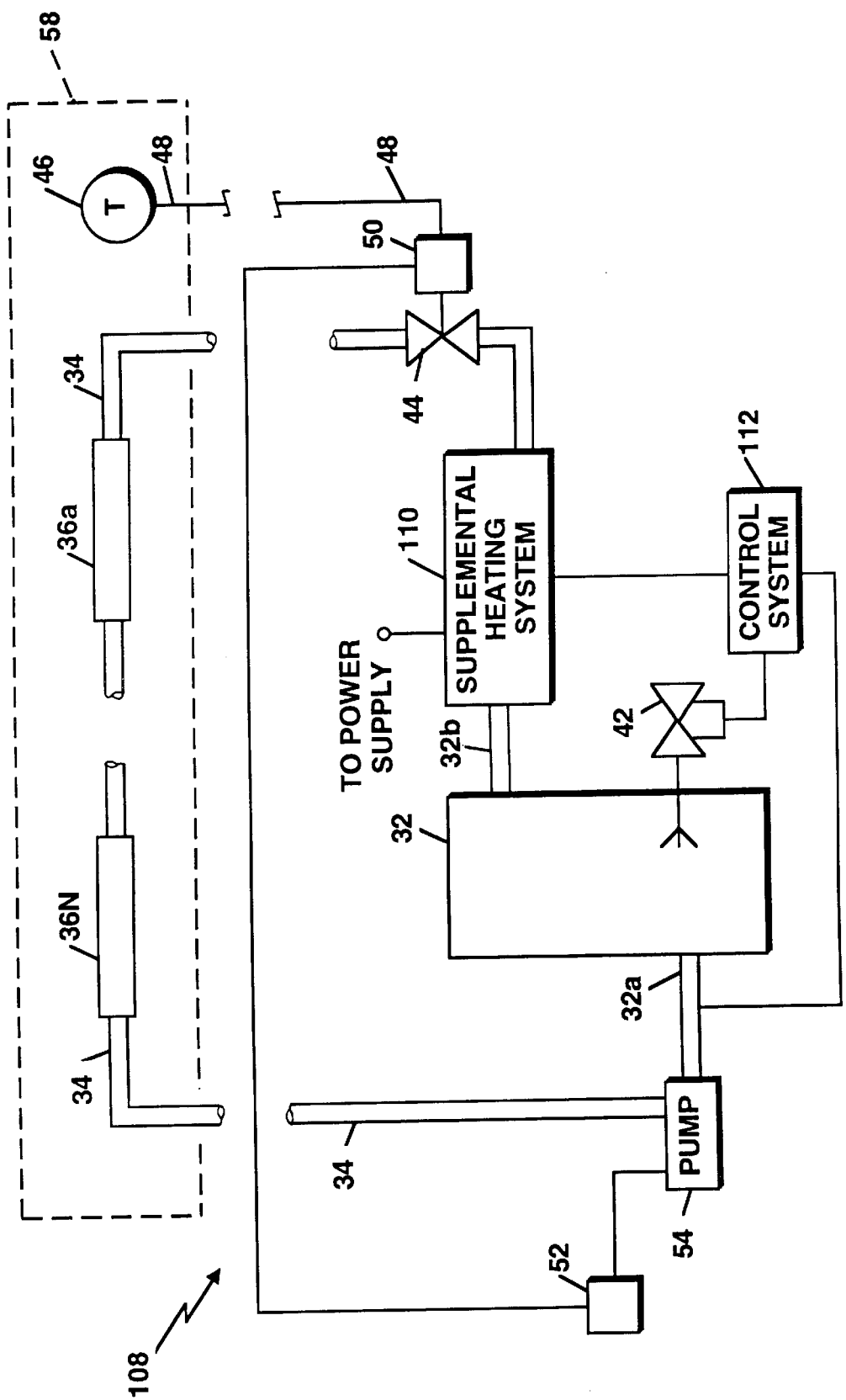
FIG. 4 is a block diagram of a supplemental heating system.

Referring now to FIG. 4, a heating system 108 includes a supplemental heating system 110 and a control system 112. The remaining elements of heating system 108 correspond to like numbered elements of heating system 30 described above in conjunction with FIG. 2. In heating system 108, the supplemental heating system 110 is coupled to the output port 32b of furnace 32. An output port of supplemental heating system 110 is coupled to control valve 44. Control system 112 is coupled to supplemental heating system 110, burner 42 and the input port 32a of furnace 32. Control system 112 detects the temperature of the fluid entering furnace 32 at input port 32a and in response to a control signal from supplemental heating system 110, control system 112 provides a control signal to burner 42. Thus, if supplemental heating system 110 is operative, (i.e. receiving electrical power from a power supply) control system 112 prevents burner 42 from igniting fuel. If heating system 110 is operative and control system 112 detects a temperature of the fluid entering furnace 32 lower than a predetermined threshold value, then heater 110 will be disabled and heating returned to furnace 32 until temperatures are re-established. If supplemental heating system 110 is not receiving electrical power, then control system 112 causes burner 42 to ignite fuel thereby heating fluid in furnace 32. The fluid thus heated is then circulated through pipes 34 and heat emitting units 36 as described above in conjunction with FIG. 2.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

I claim:

1. A supplemental heating system for use in a residential or a commercial building having an existing heating system therein, the supplemental heating system having an input fluid port, an output fluid port, a supplemental heater power supply terminal and a supplemental heater control terminal, the supplemental heating system comprising:
a housing comprising an electric heater, said housing having a first electric heater fluid port coupled to the input fluid port of the supplemental heating system, a second electric heater fluid port coupled to the output fluid port of the supplemental heating system, said electric heater including a first electric heater terminal coupled to the power supply terminal of the supplemental heating system and a second electric heater terminal;
a meter coupled to one of the first and second electric heater terminals, said meter for measuring the amount of electricity used by said electric heater;
a temperature control circuit having a first temperature control circuit terminal coupled to the second electric heater terminal and a second temperature control circuit terminal; and
a relay having a first relay terminal coupled to the second terminal of said temperature control circuit and a second relay terminal coupled to the supplemental heater control terminal of the supplemental heating system, said relay for receiving control signals through the supplemental heater control terminal and in response thereto for providing an activation sign which allows said electric heater to draw power through the supplemental heater power supply terminal.

2. The heating system of claim 1 further comprising an indicator for indicating when said electric heater is receiving power, said indicator coupled to at least one of the first and second terminals of said electric heater.

3. The heating system of claim 2 further comprising a switch having a first terminal coupled to the first terminal of the electrical heater and a second terminal coupled to the power supply terminal of the supplemental heating system wherein when said switch is in a first position said electric heater is able to receive a current signal through the power supply terminal of the supplement heating system and when said switch is in a second different position said electric heater cannot receive a current signal through the power supply terminal of the supplemental heater.

4. The heating system of claim 3 wherein said temperature control circuit is provided as an adjustable temperature control circuit.

5. The heating system of claim 2 further comprising a switch having a first terminal coupled to the second terminal of said temperature control circuit and a second terminal coupled to the first terminal of said relay.

6. A heating system comprising:
a primary heater having an input port and an output port;
a supplemental heater having a power supply terminal, a control terminal, an input port coupled to the output port of said primary heater and an output port coupled to the input port of said primary heater;
a relay having a first terminal coupled to the control terminal of said supplemental heater, said relay including means for receiving a radio frequency control signal wherein in response to the control signal fed thereto said relay allows said supplemental heater to draw power through the power supply terminal of said supplemental heater; and
a meter, having a first terminal coupled to at least one of the power supply terminal and the control terminal of said supplemental heater, said meter for recording the amount of power used by said supplemental heater.

7. The system of claim 6 wherein said supplemental heater comprises an electrical resistance heater.

8. The system of claim 7 wherein said relay comprises a radio controlled switch.

9. The system of claim 8 further comprising an indicator having an input terminal coupled to at least one of the power supply terminal and the control terminal of said supplemental heater.

10. The system of claim further comprising:
power supply: and
a switch having a first terminal coupled to the power supply terminal of said electrical resistance heater and having a second terminal adapted to receive electrical power from said power supply.

11. The system of claim 9 further comprising a temperature control circuit having a first terminal coupled to the control terminal of said electrical resistance heater and having a second terminal coupled to the first terminal of said radio controlled switch.

12. The system of claim 11 further comprising a switch having a first terminal coupled to the second terminal of said temperature control circuit and having a second terminal coupled to the first terminal of said relay.

13. The system of claim 6 further comprising:
a water heater having an input port and an output port; and
a heat exchanger having a first port coupled to the input port of said supplemental heater and having a second port coupled to the output port of said supplemental heater, having a third port coupled to the input port of said hot water heater and having a fourth port coupled to the output port of said hot water heater.

14. The system of claim 13 further comprising:
a first pump having a first port coupled to at least one of the first and second ports of said heat exchanger and a second port coupled to at least one of the input and output ports of said supplemental heater; and
a second pump having a first port coupled to at least one of the third and fourth ports of said heat exchanger and a second port coupled to at least one of the input and output ports of said water heater.

15. A heating system comprising:
a primary heating unit having an input port and an output port;
a pump having a pump input port and a pump output port, said pump input port in fluid communication the output port of said primary heating unit, a secondary heating unit having a power supply terminal, a control terminal, an output port in fluid communication with the input port of said primary heating unit and an input port in fluid communication with the pump output port such that fluid flows from the output port of said secondary heating unit to the input port of said primary heating unit;

a relay having a first terminal coupled to the control terminal of said secondary heating unit, said relay including means for receiving a control signal; and a meter, having a first terminal coupled to a first one of the power supply terminal and the control terminal of said secondary heating unit said meter for measuring the amount of power consumed by said secondary heating unit.

16. The system of claim 15 further comprising:

a water heater having a fluid input port and a fluid output port; and a heat exchanger having a first fluid port in fluid communication with the fluid input port of said supplemental heater and having a second fluid port in fluid communication with the output port of said supplemental heater and having a third fluid port in fluid communication with the fluid input port of said water heater and having a fourth fluid port in fluid communication with the output port of said water heater.

17. The system of claim 16 further comprising:

a second pump having a first fluid port in fluid communication with a first one of the first and second fluid ports of said heat exchanger and a second fluid port in fluid communication with a first one of the input and output fluid ports of said supplemental heater; and a third pump having a first fluid port in fluid communication with a first one of the third and fourth fluid ports of said heat exchanger and a second fluid port in fluid communication with a first one of the input and output fluid ports of said water heater.

18. The heating system of claim 17 further comprising a first indicator coupled to a first one of the power supply terminal and the control terminal of the secondary heating unit to indicate when said secondary heating unit is receiving power.

19. The heating system of claim 18 further comprising a switch having a first terminal coupled to the control terminal of said secondary heating unit and a second terminal coupled to the first terminal of said relay.

* * * * *

UNITED STATES PATENT AND TRADEMARK OFFICE
CERTIFICATE OF CORRECTION

PATENT NO. : 5,805,856
DATED : September 8, 1998
INVENTOR(S) : Hanson

It is certified that error appears in the above-identified patent and that said Letters Patent is hereby corrected as shown below:

| Column | Line(s) | Reads | Should read |
|--------|---------|-------|-------------|
| Cover | Attorney | McClennan | McClennen |
| 7 | 18 | should appreciated | should be appreciated |
| 7 | 47 | 906 | 90b |
| 8 | 10 | Coupled | coupled |
| 8 | 13 | Aternatively | Alternatively |
| 10 | 13 | wherein response | wherein in response |
| 10 | 29 | claim further | claim 9 further |

Signed and Sealed this

Twentieth Day of April, 1999

Attest:

Q. TODD DICKINSON

*Attesting Officer*  *Acting Commissioner of Patents and Trademarks*